US008700415B2

(12) United States Patent
Venzon et al.

(10) Patent No.: US 8,700,415 B2
(45) Date of Patent: Apr. 15, 2014

(54) METHOD AND SYSTEM FOR DETERMINING EFFECTIVENESS OF A COMPLIANCE PROGRAM

(75) Inventors: Laurie A. Venzon, Davidson, NC (US); Jennifer B. Francois, Charlotte, NC (US); Kimberly A. Laight, Greensboro, NC (US); Rick Hajda, Charlotte, NC (US); Christine B. Doyle, Charlotte, NC (US); David R. Cormak, Chesterfield, MO (US); Charles F. Bowman, Charlotte, NC (US); Peter John Haines, Suffolk (GB)

(73) Assignee: Bank of America Corporation, Charlotte, NC (US)

( * ) Notice: Subject to any disclaimer, the term of this patent is extended or adjusted under 35 U.S.C. 154(b) by 2148 days.

(21) Appl. No.: 11/160,121

(22) Filed: Jun. 9, 2005

(65) Prior Publication Data

US 2006/0282276 A1 Dec. 14, 2006

(51) Int. Cl.
*G06Q 10/00* (2012.01)

(52) U.S. Cl.
USPC .......................................................... 705/1.1

(58) Field of Classification Search
USPC ............................................. 705/1, 1.1, 500
See application file for complete search history.

(56) References Cited

U.S. PATENT DOCUMENTS

| | | | | |
|---|---|---|---|---|
| 7,523,053 | B2 * | 4/2009 | Pudhukottai et al. | 705/30 |
| 2002/0188182 | A1 * | 12/2002 | Haines et al. | 600/300 |
| 2004/0068431 | A1 * | 4/2004 | Smith et al. | 705/10 |
| 2005/0071185 | A1 | 3/2005 | Thompson | |
| 2006/0185019 | A1 * | 8/2006 | Wong | 726/26 |
| 2012/0158678 | A1 * | 6/2012 | McGraw et al. | 707/694 |

OTHER PUBLICATIONS

Bank of America, International Search Report, International Patent Application PCT/US06/22045, dated Jul. 16, 2007.
Bank of America, Written Opinion, International Patent Application PCT/US06/22045, dated Jul. 16, 2007.
European Patent Office, Extended European Search Report, Dec. 2, 2009, pp. 1-4, Munich, Germany.

* cited by examiner

*Primary Examiner* — Jonathan Ouellette
*Assistant Examiner* — Michael Thompson
(74) *Attorney, Agent, or Firm* — Michael A. Springs; Moore & Van Allen, PLLC; Padowithz Alce

(57) ABSTRACT

A method and system for determining effectiveness of a compliance program may include collecting subjective data related to effectiveness of the compliance program and means therefore. The method and system may also include collecting objective data related to effectiveness of the compliance program and means therefore. The method and system may further include calculating compliance effectiveness scores in response to a combination of the subjective data and objective data and means therefore.

25 Claims, 10 Drawing Sheets

METHOD AND SYSTEM FOR DETERMINING EFFECTIVENESS OF A COMPLIANCE PROGRAM

BACKGROUND OF INVENTION

The present invention relates to managing compliance programs and the like and more particularly to a method and system for determining effectiveness of a compliance program.

Virtually every business, organization or the like has internal policies and procedures that employees or associates are required to follow or comply with. While many of these policies may be necessary for efficient operation of the business or organization, some may be necessary to comply with laws and regulations enforced by government supervisory or regulatory agencies or bodies. A compliance program is normally implemented to define such policies and procedures, to promulgate the policies and procedures, and to insure adherence to the policies and procedures by employees or associates. An important aspect that is missing from known compliance programs is a means to accurately and comprehensively measure and evaluate the effectiveness of different aspect or elements of such programs and to make any needed adjustments based on those measurements and evaluations.

SUMMARY OF INVENTION

In accordance with an embodiment of the present invention, a method for determining effectiveness of a compliance program may include collecting subjective data related to effectiveness of the compliance program and collecting objective data related to the effectiveness of the compliance program. The method may further include calculating a compliance effectiveness score in response to a combination of the subjective data and the objective data.

In accordance with another embodiment of the present invention, a method for determining effectiveness of a compliance program may include collecting subjective data. Collecting subjective data may further include evaluating responses to a compliance survey. The compliance survey may include statements related to commitment and accountability, statements related to compliance of policies and procedures, and statements related to controls and supervision. The survey may also include statements related to regulatory oversight, statements related to monitoring efforts, statements related to reporting compliance issues, and statements related to training and awareness of compliance. The method may also include collecting objective data. Collecting objective data may include using a variety of different metrics as determined by any user of the method. For example, such objective data may include determining a number of compliance related projects not meeting a predetermined threshold, determining a number of outstanding compliance and regulatory issues, and determining a number of violations of policies and regulations. Collecting objective data may also include determining a number of unresolved compliance program assessment gaps, determining a number and severity of issues raised by supervisory and regulatory agencies, evaluating effectiveness of monitoring regulatory and compliance issues, determining a percentage of compliance monitoring activities and projects completed, and determining a percentage of employees meeting compliance training requirements or any other measurement that may be deemed applicable and useful for determining the effectiveness of the compliance programs.

In accordance with another embodiment of the present invention, a system for determining effectiveness of a compliance program may include means for collecting subjective data related to effectiveness of the compliance program. The system may also include means for collecting objective data related to effectiveness of the compliance program. The system may further include means for calculating a compliance effectiveness score in response to a combination of the subjective data and objective data.

In accordance with a further embodiment of the present invention, a computer program product for determining effectiveness of a compliance program may include a computer readable medium having computer readable program code embodied therein. The computer readable medium may include computer readable program code configured to collect subjective data related to effectiveness of the compliance program. The computer readable medium may also include computer readable program code configured to collect objective data related to effectiveness of the compliance program; and computer readable program code configured to calculate a compliance effectiveness score in response to a combination of the subjective data and objective data.

DETAILED DESCRIPTION

Figure 1A:
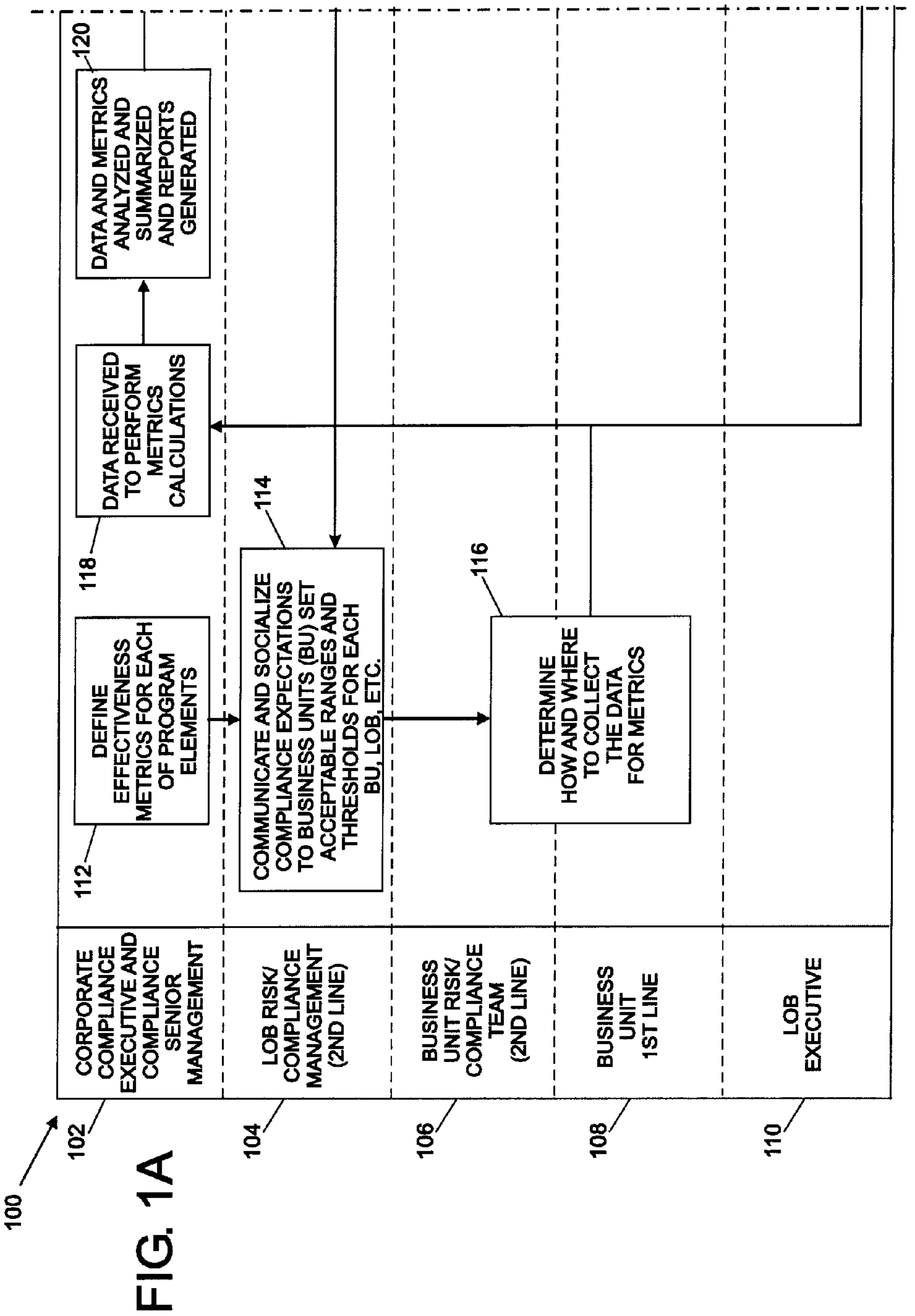
FIGS. 1A and 1B (collectively FIG. 1) are a flow chart of an example of a method for determining effectiveness of a compliance program in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk or C++ or the like. However, the computer program code for carrying out operations of the present invention may also be written in conventional procedural programming languages, such as the "C" programming language or similar programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1B:
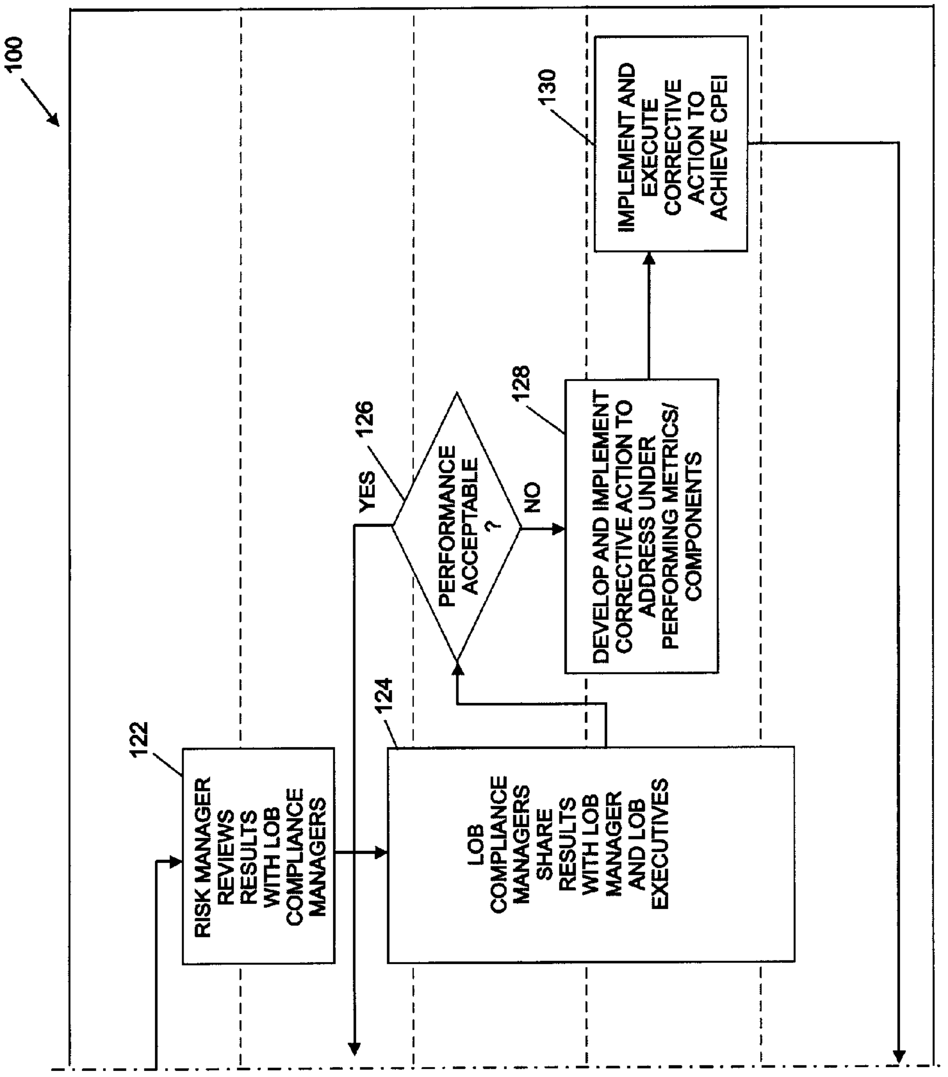

FIGS. 1A and 1B (collectively FIG. 1) are a flow chart of an example of a method 100 for determining effectiveness of a compliance program in accordance with an embodiment of the present invention. The flow chart is divided into sections or "swim lanes" to illustrate which level or levels of management may be responsible for each operation. Examples of the different levels of management may include "corporate compliance executive and compliance senior management" in lane 102, "line of business (LOB) risk compliance management", second line management or the like in lane 104, "business unit (BU) risk/compliance team" in lane 106, the "business unit" or employees within the business unit in lane 108 or first line management, and the "LOB executive" in lane 110. The levels of management depicted are merely examples and different levels or descriptions for the level of management may be applicable depending upon the particular implementation of the invention. The invention is not intended to be limited by the levels of management depicted or described.

In block 112, effectiveness metrics may be defined for each of the compliance program elements. The examples of the different metrics and program elements will be described in more detail with respect to FIG. 2. As illustrated in the example of FIG. 1A, the effectiveness metrics and program elements may be defined by a corporate compliance executive and compliance senior management or similar management personnel.

In block 114, compliance expectations may be communicated to the different business units within an organization or business. The compliance expectations may be ingrained or socialized into the operations of the business unit. Acceptable ranges and thresholds may be set for each business unit and line of business. Communicating the compliance expectations and setting acceptable ranges and thresholds may be performed by the line of business risk/compliance management or similar level of management. Depending upon the nature and environment of each line of business, the acceptable ranges of thresholds set may be different so that one size does not fit all. This permits comparison of programs between lines of business. The acceptable ranges and thresholds for the various metrics may be determined by each individual line of business. Accordingly, each business may determine their range annually for what may be a "green", "yellow" or "red" score or similar score identification for each of the metrics based on their knowledge of their environment. As an example, a "green" score or indication may represent an element that is currently operating at an effective state. A "yellow" score or indication may represent an element that is not as effective as it could be or may need some attention. A "red" score or indication may represent an element that is operating ineffectively and needs immediate attention. The scale may be set each year by each business unit, line of business or entity according to particular conditions, business environment or the like. For example, assuming a 100 point scale, a "red" score may be any score less than 76, a "yellow" score may be between 77 and 89 and a "green" score may be 90 or above. In the following year, a decision may be made to raise the bar. Thus, a "red" score may be any score less than 80, a "yellow" score may be between 81 and 92 and a "green" score may 93 or above. Accordingly, the present invention allows for variability between lines of business and also provides for the ability to establish a fair comparison, as well as, a composite score for the company.

In block 116, a determination may be made how and where to collect the data for the various metrics. This operation may be performed by the business level risk/compliance team in lane 106 and the business unit 108 as illustrated in the example of FIG. 1A.

In block 118, data may be received to perform metric calculations. As will be described in more detail herein, the method 100 may be web-embodied and performed utilizing a network, such as an intranet or other private network similar to the Internet. Accordingly, the data to perform metric calculations may be accessed or received over a network by accessing different databases, servers or systems.

In block 120, the data and metrics may be analyzed and summarized. Reports may be generated by the system or method 100. In block 122, a risk or compliance manager or the like may review the results with a line of business compliance manager or similar manager. In block 124, the line of business compliance managers may share the results with line of business managers and line of business executives or similar levels of management.

In block 126, a determination may be made whether the performance is acceptable. If performance is acceptable, the method 100 may return to block 114 and the method 100 may proceed as previously described. If performance is not acceptable in block 126, the method 100 may advance to block 128. In block 128, corrective action may be developed and implemented to address any under performing metrics or components. In block 130, the corrective action may be implemented and executed to achieve a desired compliance program effectiveness indicator (CPEI) or score. The method 100 may then return to block 118 where additional or subsequent data may be received to perform metric calculation and the method 100 may proceed as previously described.

FIGS. 2A-2E (collectively FIG. 2) are a flow chart of an example of a method 200 for measuring and evaluating different elements of a compliance program or system for determining effectiveness of the compliance program in accordance with an embodiment of the present invention. Examples of different elements of a compliance program or system may include commitment and accountability; policies and procedures; controls and supervision; regulatory oversight; monitoring; training and awareness; reporting; and the like.

In block 202, a commitment and accountability element of the compliance program may be measured. The different effectiveness metrics that may be involved in the commitment and accountability element may include a compliance survey, management of compliance related projects and management of compliance related audit issues. In block 204, responses to compliance survey statements or questions related to commitment and accountability may be evaluated. Examples of survey statements related to commitment and accountability are listed below. The respondent may be asked to respond by selecting “Strongly Agree”, “Agree”, “Somewhat Agree”, “Somewhat Disagree”, “Disagree”, “Strongly Disagree”, “Don’t Know” or “Not Applicable (N/A)”.

(1) My manager actively promotes a culture of compliance throughout my LOB or Support Group.

(2) Compliance metrics and risk or compliance awareness have been incorporated into my performance plan.

(3) I believe my manager holds associates accountable for meeting the regulatory and ethical requirements associated with their respective positions.

(4) Comprehensive compliance activities for managing regulatory requirements and ethical standards are communicated to me.

(5) Management has clearly communicated to me the importance of Anti-Money Laundering compliance efforts.

(6) Overall, I am satisfied with the Commitment and Accountability to compliance in my LOB or Support Group.

It should be noted that the statements could be rephrased as questions and the invention is not intended to be limited by whether the survey includes statements or questions and for purposes of this invention are interchangeable. The respondent may also be asked to provide additional detail for the statements with which he or she disagrees and to specify what is lacking and what can be improved. The respondent may also be asked how the level of commitment and accountability to compliance may be improved in his or her LOB or Support Group.

Figure 2A:
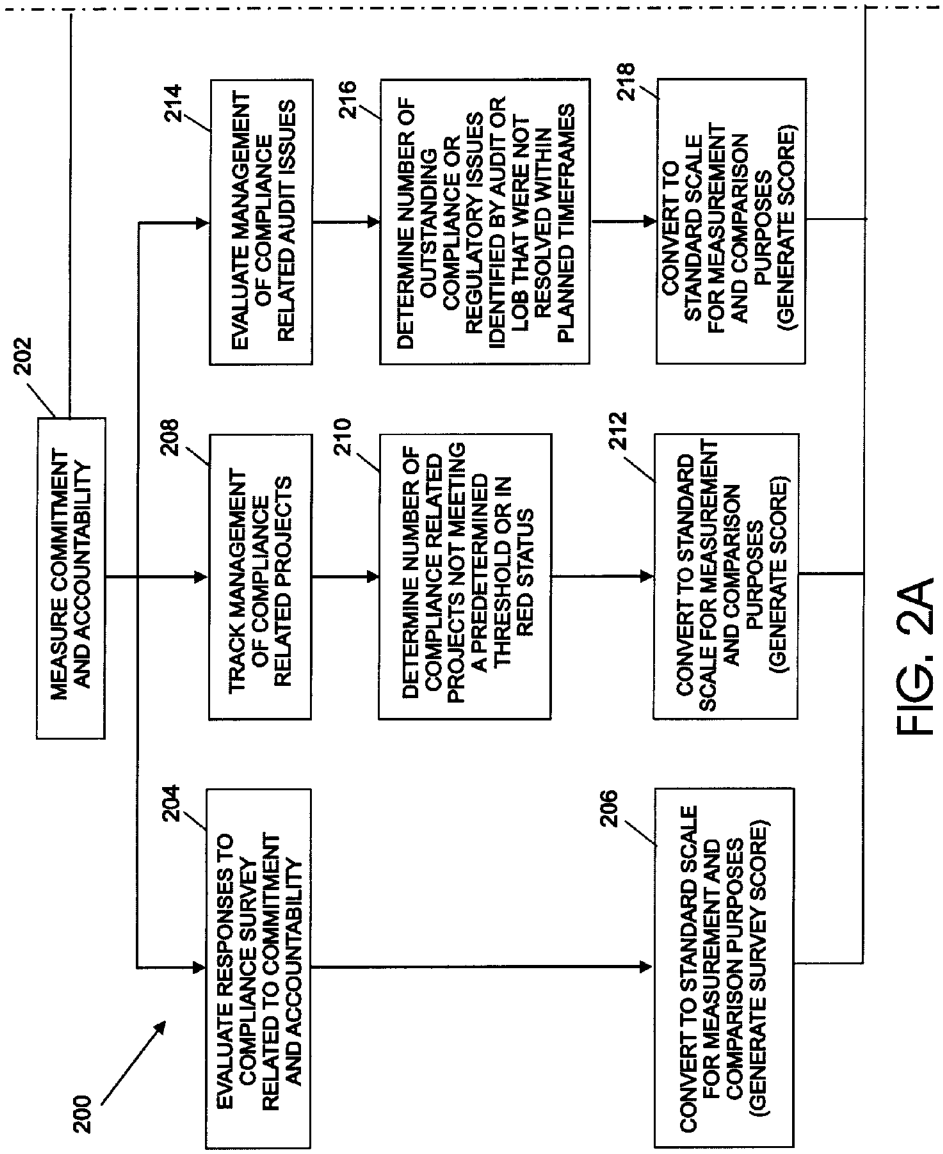
FIGS. 2A-2E (collectively FIG. 2) are a flow chart of an example of a method for measuring and evaluating different elements and metrics of a compliance program or system for determining effectiveness of the compliance program in accordance with an embodiment of the present invention.
Figure 2B:
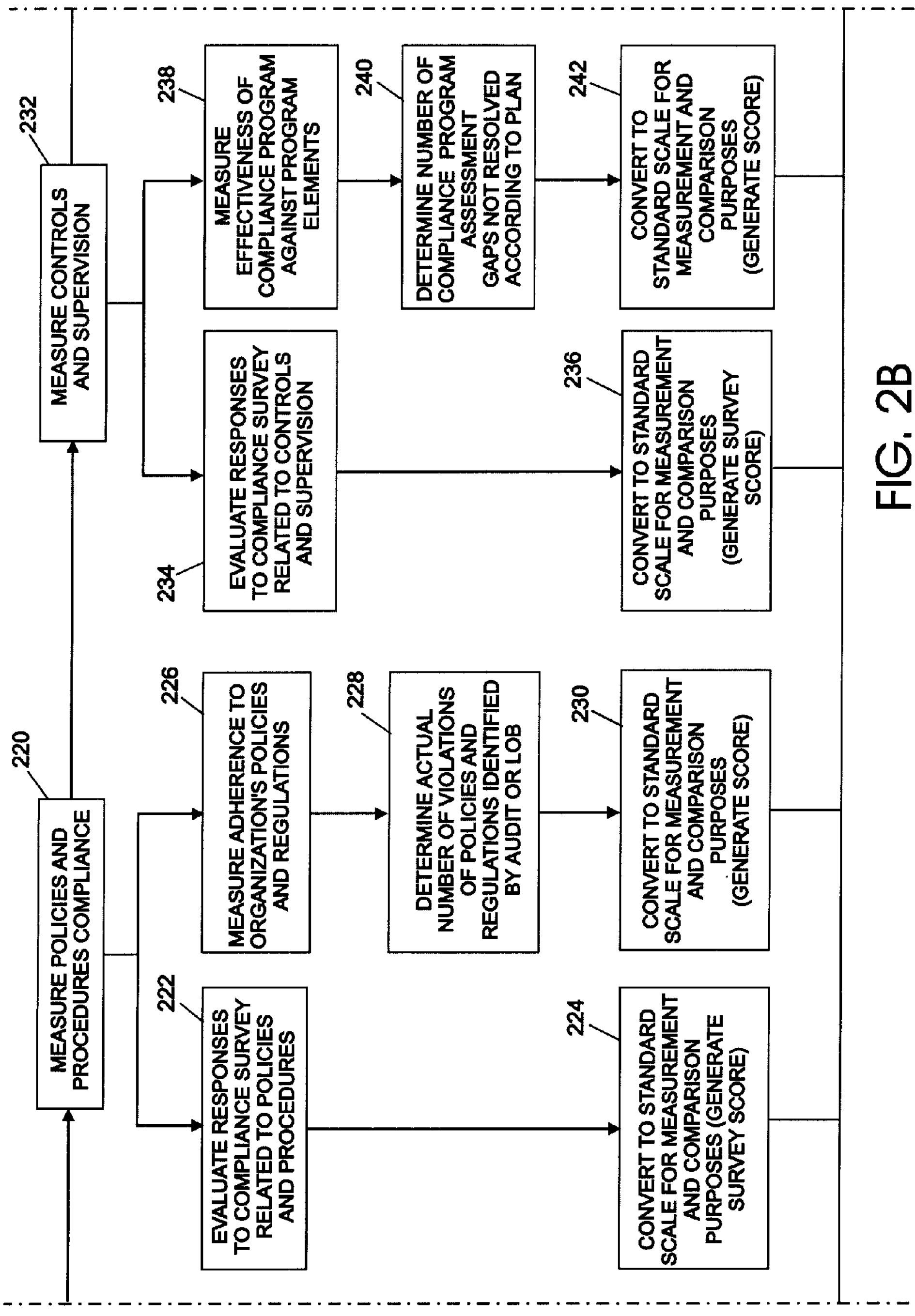
Figure 2C:
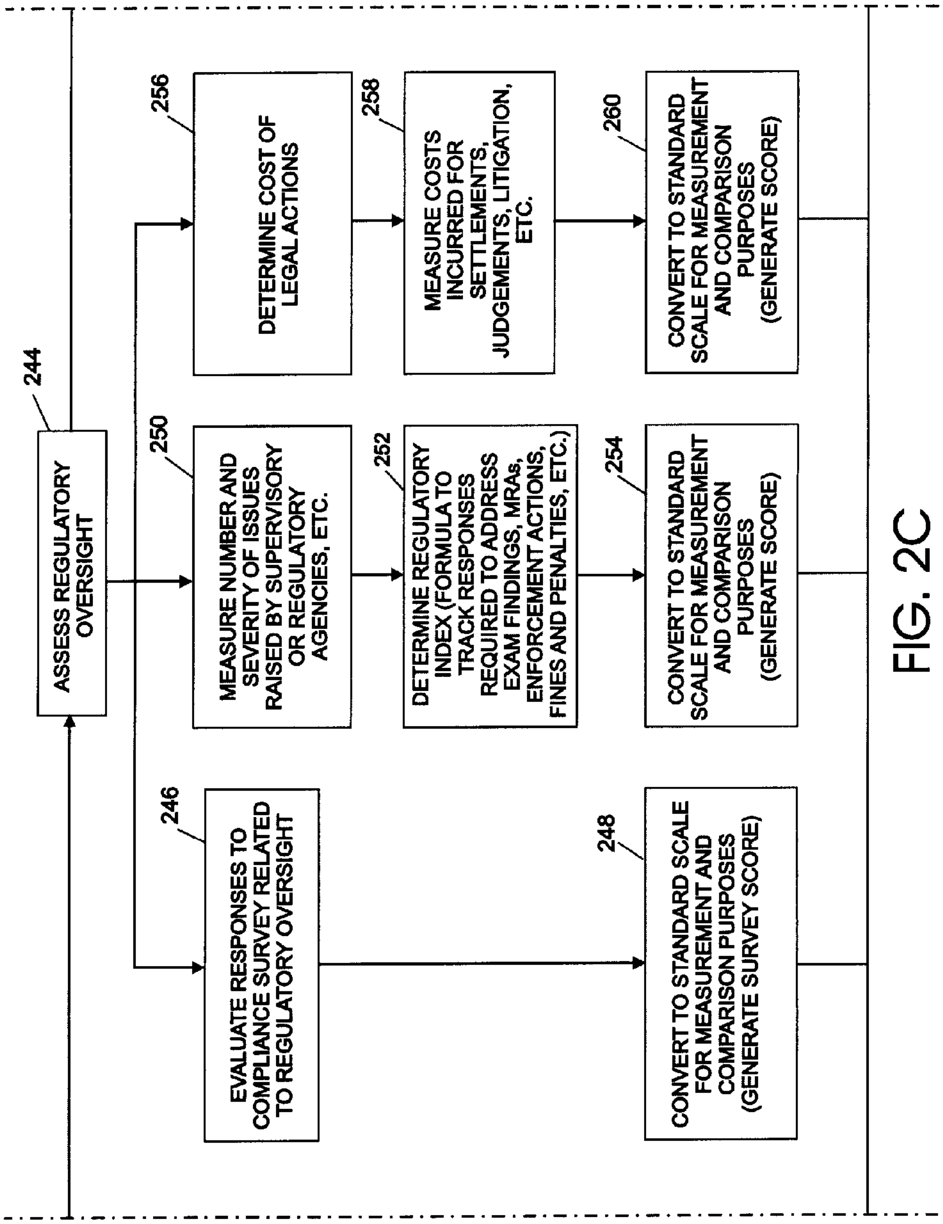
Figure 2D:
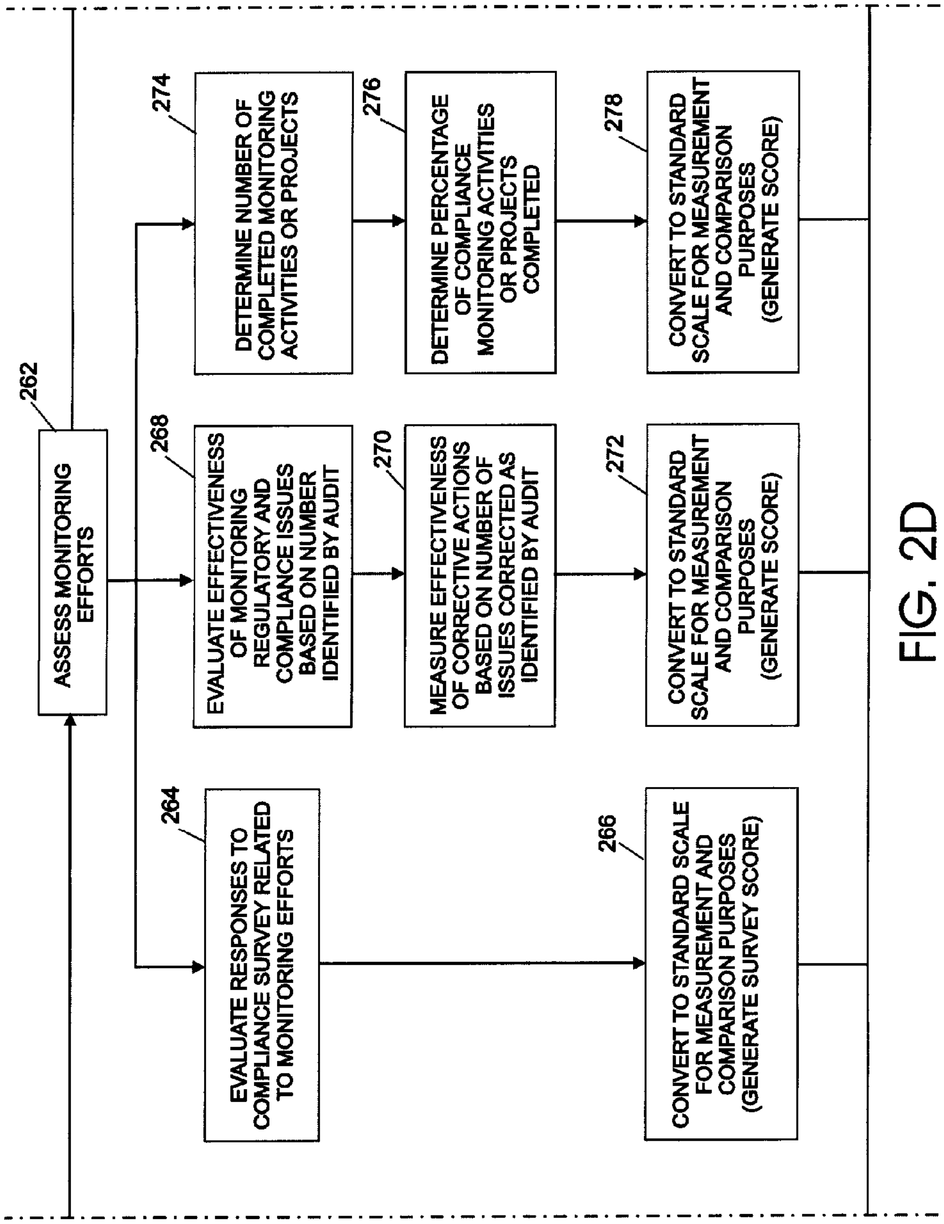
Figures 2, 2E:
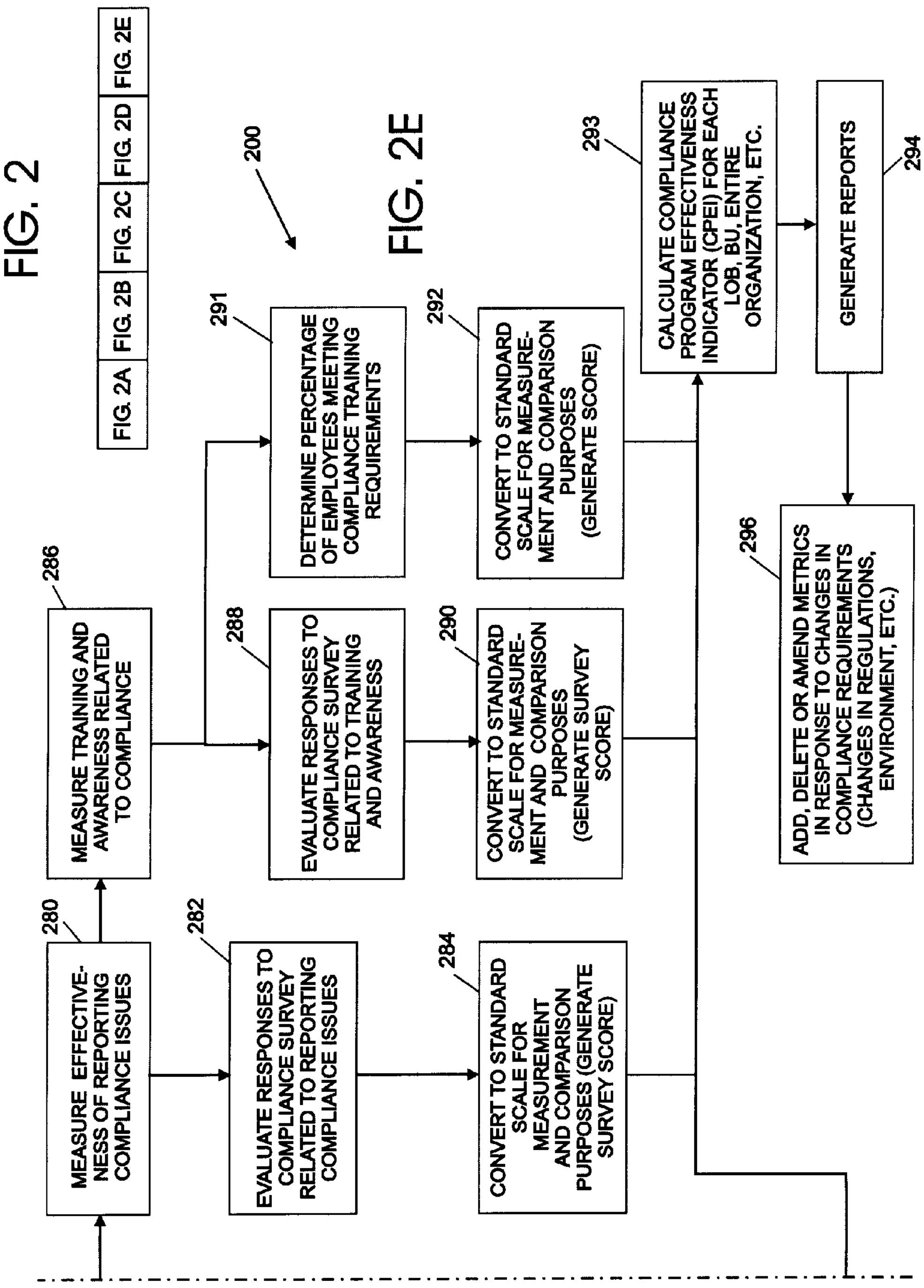

In block 206, the survey results may be converted to a standard scale for purposes of comparison across lines of business. For example, each different response from “Strongly Agree” to “Strongly Disagree” may be assigned a numerical value. A survey score may then be generated for the commitment and accountability element of the compliance program. The survey score may be combined with other survey scores for responses to other survey statements and with compliance scores for the different effectiveness metrics for use in calculating a Compliance Program Effectiveness Indicator (CPEI) as described in more detail with respect to block 293 (FIG. 2E).

In block 208, management of compliance related projects may be tracked to measure the commitment to resolve issues that could negatively impact projects. In block 210, a number of compliance related projects not meeting a predetermined threshold or in a “red status” may be determined from tracking the projects in block 208. In block 212, the number of projects from block 210 may be converted to a standard scale for measurement and comparison purposes. The standard scale facilitates comparing metric results across different lines of business as previously described. For example, each of the ranges may be different between lines of business corresponding to a standard scale which may include “excellent”, “solid” or “needs improvement” levels or similar standard scale levels as may be appropriate for the particular business or industry. As previously described, the different lines of business or business units may determine their own ranges or thresholds for each level within the standard scale. In this manner, one size does not fit all since the lines of business may operate in different environments and under different conditions.

A compliance score may also be generated in block 212 in response to the number of compliance related projects not meeting a predetermined threshold or in red status and where this number may fall on the standard scale. The compliance score generated may be used in combination with other survey scores and compliance scores of other effectiveness metrics to calculate the CPEI as discussed in more detail with respect to block 293 (FIG. 2E).

In block 214, management of compliance related audit issues may be evaluated. This metric may track the number of outstanding or regulatory issues identified by audit or the line of business that were not resolved within a planned or predetermined timeframe. In block 216, a number of outstanding compliance or regulatory issues identified by audit or line of business that were not resolved with the planned or predetermined time frame may be determined. Compliance or regulatory issues may be tracked or managed in a database that may include the status and whether any issues are unresolved after a predetermined time period.

In block 218, the results from block 216 may be converted to a standard scale of measurement to facilitate comparison across different lines of business similar to that described with respect to block 212. Each line of business may set its own thresholds or ranges for each level in a common scale. A compliance score may be generated in block 218 in response to the number of outstanding compliance or regulatory issues in block 216 and where that number may fall on the standard scale. The compliance score generated may be used to calculate the CPEI in block 293 (FIG. 2E).

In block 220, a policies and procedures compliance element of the compliance program may be measured. In block 222, responses to compliance survey statements related to policies and procedures may be evaluated. Examples of statements are listed below and respondents may respond by selecting responses in a range from "Strongly Agree" to "Strongly Disagree" or "Don't Know" or "N/A" similar to that described with respect to block 204. Examples of the statements may include:

(1) I know where to locate current Policies and Procedures.

(2) Policies and Procedures governing my LOB/Support Group provide me clear directions in performing my day-to-day role.

(3) Policies and Procedures governing my LOB/Support Group are updated appropriately.

(4) Compliance requirements are integrated into the Policies and Procedures that govern my LOB/Support Group.

(5) Policies and Procedures governing my LOB/Support Group are easy to use.

(6) My LOB/Support Group has written Anti-Money Laundering Policies and Procedures.

(7) Overall, I am satisfied with Policies and Procedures in my LOB/Support Group.

The respondent may also be asked to provide additional detail for the statements with which he or she disagrees and to specify what is lacking and what can be improved. The respondent may also be asked how the level of commitment and accountability to compliance may be improved in his or her LOB or Support Group.

In block 224, the results of the compliance survey may be converted to a standard scale similar to that previously described with respect to blocks 206 and 212. The standard scale permits comparison between different lines of business. A survey score for the policies and procedures compliance element of the compliance program may also be generated in block 224 in response to the survey results. The survey score may be used in block 293 to calculate the overall CPEI.

In block 226, adherence to an organization's policies and regulations may be measured. The actual number of instances in which associates failed to follow policies, procedures or regulations may be measured as determined by audits or by the line of business. In block 228, the actual number of violations of policies and regulations may be determined. In block 230, the results from block 228 may be converted to a standard scale for measurement and comparison purposes similar to that previously described. A compliance score may be generated in block 230 in response to the actual number of violations of policies and regulations and where this number may fall on the standard scale. The compliance score may be combined with survey scores and compliance scores for other effectiveness metrics to calculate the CPEI in block 293 (FIG. 2E).

In block 232, compliance program elements involving controls and supervision may be measured. In block 234, responses to compliance survey statements related to controls and supervision may be evaluated. Examples of statements related to controls and supervision are listed below. A respondent may select a response from a range of response between "Strongly Agree" to Strongly Disagree" or "Don't Know" or "N/A", similar to that previously described. Example statements may include:

(1) Management has implemented appropriate Controls and Supervision to resolve compliance issues and manage risk in my LOB/Support Group.

(2) Adequate escalation processes are in place for compliance risk issues.

(3) Controls and Supervisory procedures are periodically reviewed and updated.

(4) Changes to Controls and Supervisory procedures are communicated to me in a timely manner.

(5) Management has implemented appropriate Controls and Supervision in my LOB/Support Group to check for compliance with Anti-Money Laundering rules and regulations.

(6) Overall, I am satisfied with the Controls and Supervision in LOB/Support Group.

The respondent may also be asked to provide additional detail for the statements with which he or she disagrees and to specify what is lacking and what can be improved. The respondent may also be asked how the controls and supervision may be improved in his or her LOB or Support Group.

In block 236, the results of the responses to the survey may be converted to a standard scale of measurement similar to that previously described. A survey score for the controls and supervision element of the compliance program may be generated base of the converted results. The survey score may be combined with other survey scores and compliance scores for the different effectiveness metrics to calculate a CPEI in block 293 (FIG. 2E).

In block 238, effectiveness of the compliance program may be measured against program elements. This metric may involve tracking the number of compliance program assessment gaps not resolved according to plan. An annual compliance program assessment may be conducted for each compliance program to determine any "gaps." A gap may be defined as a difference between an expected or desired compliance assessment or score and an actual compliance assessment or score. A plan to close these gaps may then be developed with deadlines for completion. The metric may track completion according to the plan. In block 240, a number of compliance program assessment gaps not resolved according to plan may be determined. In block 242, the results from block 240 may be converted to a standard scale similar to that previously described to facilitate measurement and comparison. A compliance score may be generated in block 242 in response to the number of compliance program assessment gaps not resolved according to plan. The compliance score may be used in combination with the survey scores and other compliance scores for other effectiveness metrics to calculate an overall CPEI in block 293 (FIG. 2E).

In block 244, the regulatory oversight element of the compliance program may be assessed. In block 246, responses to compliance survey statements related to regulatory oversight may be evaluated. Example statements are listed below and the responses may be in a range from "Strongly Agree" to "Strongly Disagree", "Don't Know" or "N/A", similar to that previously described. Example statements may include:

(1) A process is in place to identify and promptly assess the impact of emerging regulatory changes in my LOB/Support Group.

(2) Applicable regulatory changes are communicated clearly and in a timely manner.

(3) Associates or employees in my LOB/Support Group are notified of changes in Anti-Money Laundering regulatory requirements in a timely manner.

(4) Overall, I am satisfied with the processes to manage the regulatory environment in my LOB/Support Group.

The respondent may also be asked to provide additional detail for the statements with which he or she disagrees and to specify what is lacking and what can be improved. The respondent may also be asked how regulatory oversight may be improved in his or her LOB or Support Group.

In block 248, the survey results may be converted to a standard scale as previously described for measurement and comparison purposes. A survey score may be generated in block 248 for regulatory oversight that may be used to calculate an overall CPEI in block 293 (FIG. 2E).

In block 250, a number and severity of issues raised by supervisory or regulatory agencies or the like may be measured. In block 252, a regulatory index may be determined. The regulatory index may be a formula to track responses required to address exam finding, Matters Requiring Attention (MRAs), enforcement actions, fines, penalties and the like. In block 254, the results may be converted to a standard scale for measurement and comparison purposes. A compliance score may be generated in block 254 in response to the regulatory index and the standard scale. The compliance score may be used to calculate an overall CPEI in block 293 (FIG. 2E) in combination with the survey scores and compliance scores for other metrics.

In block 256, a cost of legal actions may be determined. In block 258, costs incurred for settlements, judgments, litigation, mediation or the like may be measured or determined. In block 260, the results from block 258 may be converted to a standard scale similar to that previously described. A compliance score may be generated in block 260 in response to the measurement of the costs incurred for legal actions and the standard scale. The compliance score may be used to calculate the CPEI in block 293 similar to that previously described.

In block 262, efforts to monitor compliance may be assessed or evaluated. In block 264, responses to compliance survey statements or questions related to monitoring efforts may be evaluated. Similar to that previously described, the responses may include a range from “Strongly Agree” to “Strongly Disagree”, “Don’t Know” or “N/A”. Examples of the statements may include:

(1) Monitoring processes are in place in my LOB/Support Group for assessing compliance with laws, regulations, policies and guidelines.

(2) Results from monitoring activities in my LOB/Support Group are reviewed and reported to management in a timely manner.

(3) Adequate processes are in place in my LOB/Support Group to correct issues identified through monitoring activities.

(4) Monitoring processes are in place in my LOB/Support Group for assessing compliance with procedures for activities possibly related to money laundering or terrorist financing.

(5) Overall, I am satisfied with the Monitoring in my LOB/Support Group.

The respondent may also be asked to provide additional detail for the statements with which he or she disagrees and to specify what is lacking and what can be improved. The respondent may also be asked how monitoring may be improved in his or her LOB or Support Group.

In block 266, the results from the survey may be converted to a standard scale for measurement and comparison purposes. A survey score related to monitoring efforts may be generated in block 266. The survey score may be used in combination with other survey scores and compliance scores for the different metrics to calculate an overall CPEI in block 293 (FIG. 2E).

In block 268, effectiveness of monitoring regulatory and compliance issues may be evaluated. This metric may measure the effectiveness of monitoring and corrective action based on the number of regulatory issues identified through audit activities and reported. In block 270, effectiveness of corrective actions may be determined or measured. Data related to compliance issues and corrective actions for this metric may be stored and accessed from a database, such as a central issues tracking database or the like. In block 272, the results of blocks 268 and 270 may be converted to a standard scale similar to that previously described for measurement and comparison purposes. A compliance score may be generated in block 272 in response to the effectiveness of the monitoring and measured effectiveness of corrective actions in blocks 268 and 270, respectively. The compliance score may be used with other scores to calculate the CPEI in block 293.

In block 274, a number of completed monitoring activities or projects may be determined. In block 276, a percentage of compliance monitoring activities or projects completed may be determined. In block 278, the results of block 276 may be converted to a standard scale. A compliance score may be generated in block 278 in response to the percentage of compliance monitoring activities or projects completed that may be used in combination with other survey and compliance scores to calculate the overall CPEI in block 293.

In block 280, effectiveness of reporting compliance issues may be measured or evaluated. In block 282, responses to compliance survey statements related to reporting compliance issues may be evaluated. Similar to that previously described, responses may range from “Strongly Agree” to “Strongly Disagree” and “Don’t Know” or “N/A”. Examples of statements or questions may include:

(1) The information on compliance reports provided to me is accurate.

(2) The information on compliance reports provided to me is timely.

(3) The information on compliance reports provided to me is relevant.

(4) Management uses compliance information to effectively manage risks or compliance within my LOB/Support Group.

(5) Processes are in place in my LOB/Support Group to allow for the immediate reporting and escalation of significant Anti-Money Laundering related issues.

(6) Overall, I am satisfied with the information on compliance reports in my LOB/Support Group.

The respondent may also be asked to provide additional detail for the statements with which he or she disagrees and to specify what is lacking and what can be improved. The respondent may also be asked how reporting may be improved in his or her LOB or Support Group.

In block 284, the results from the survey may be converted to a standard scale for measurement and comparison purposes. A survey score related to effectiveness of reporting compliance issues may be generated in block 284. The survey score may be used in combination with other survey scores and compliance scores for the different effectiveness metrics to calculate the overall CPEI in block 293 (FIG. 2E).

In block 286, training and awareness of employees and associates related to compliance may be measured. In block 288 responses to compliance survey statements or questions related training and awareness of compliance may be evaluated. Similar to that previously described, responses may range from “Strongly Agree” to “Strongly Disagree” and “Don’t Know” or “N/A”. Examples of statements or questions may include:

(1) The compliance training I received is relevant to my role.

(2) The compliance training I received better equips me to perform my role.

(3) The compliance training I received is timely and relevant to changes occurring in the regulatory environment.

(4) My manager holds me personally accountable for competing required compliance training courses on time.

(5) The Anti-Money Laundering training courses in my LOB/Support Group are satisfactory.

(6) Overall, I am satisfied with the Training and Awareness in my LOB/Support Group.

The respondent may also be asked to provide additional detail for the statements with which he or she disagrees and to specify what is lacking and what can be improved. The respondent may also be asked how training and awareness may be improved in his or her LOB or Support Group.

In block 290, the results from the survey may be converted to a standard scale for measurement and comparison purposes similar to that previously described. A survey score related to compliance training and awareness may be generated in block 290. The survey score may be used in combination with other survey scores and compliance scores for the different metrics to calculate the overall CPEI in block 293 (FIG. 2E).

In block 291, a percentage of employees meeting compliance training requirements may be determined. In block 292, the results from block 291 may be converted to a standard scale for measurement and comparison purposes. Similar to that previously described. A compliance score may be generated in block 291 in response to the percentage of employees meeting compliance training requirements. The compliance score may be used in combination with survey scores and compliance scores of other metrics to calculate the CPEI in block 293.

As previously described, in block 293, an overall compliance program effectiveness indicator (CPEI) may be calculated. The CPEI may be a function of the results from responses to all of the survey statements (subjective data) and results or compliance scores from the other metrics measured and evaluated in method 200. For example, the CPEI may be an average of all the scores from all of the metrics described with respect to method 200. In block 294, any reports may be generated. In block 296, metrics may be added, deleted or amended in response to changes in compliance requirements, such as changes in regulations, laws, environment or the like.

Figure 3:
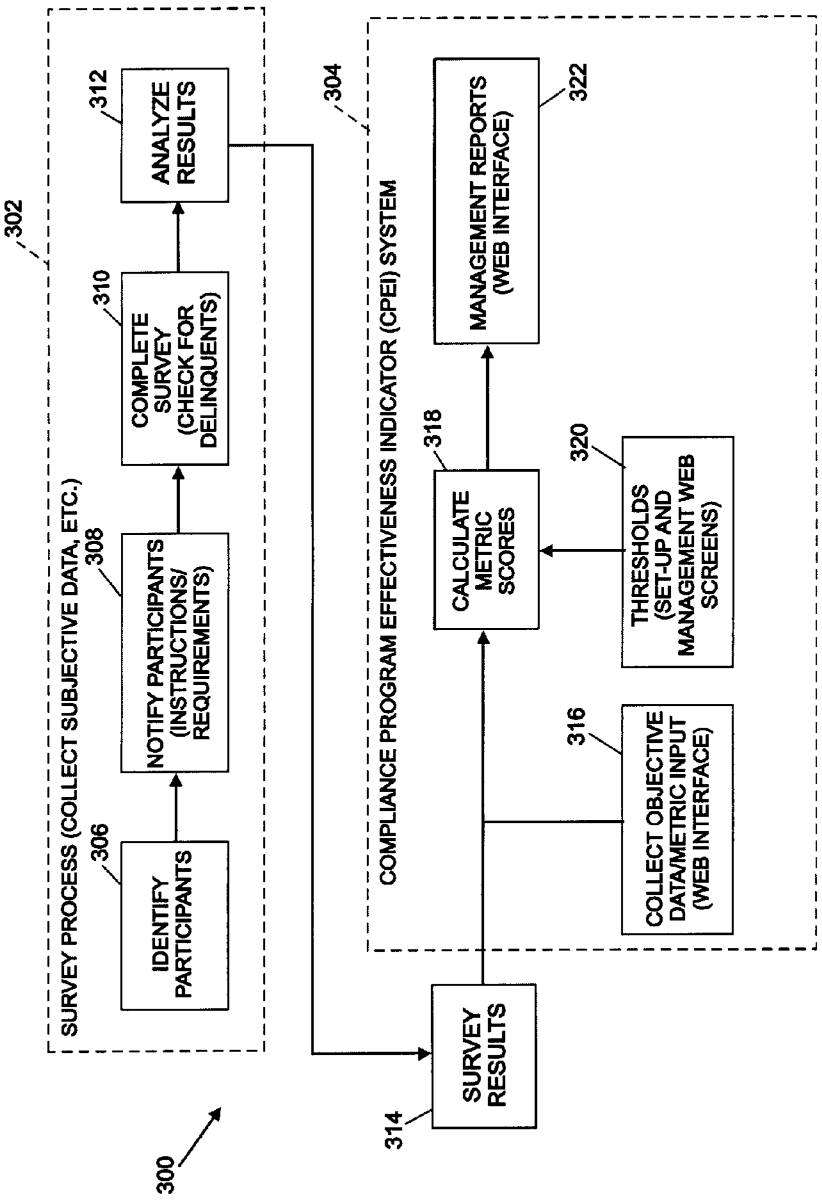
FIG. 3 is a block diagram of an example of a system for determining effectiveness of a compliance program in accordance with an embodiment of the present invention.

FIG. 3 is a block diagram of an example of a system 300 for determining effectiveness of a compliance program in accordance with an embodiment of the present invention. The method 200 described with reference to FIG. 2 may be embodied in the system 300. The system 300 may include two basic subsystems or processes, a survey process 302 and a compliance program effectiveness indicator (CPEI) system 304. The survey process 302 may collect subjective data or the like. In block 306, the survey process 302 may include identifying participants or respondents to the survey. In block 308 participants may be notified and advised of the instructions and requirements for completing the survey. In block 310, the completed survey may be received or collected. Also in block 310, a check for any delinquent participants may be performed and followed-up. In block 312 of the survey process 302, the results of the survey may be analyzed. The survey process 302 may be conducted via a web interface.

In block 314, the survey results may be transferred to the CPEI system 304. In block 316, objective data including metric data, similar to that described in method 200 of FIG. 2, may be collected. The objective data may be collected via a web interface. In block 318, metric scores may be calculated as a function of the survey results and objective data similar to that described in method 200 of FIG. 2. In block 320, thresholds and predetermined ranges for the metrics may be inputted and applied to the metric scores. As previously described, lines of business may set their own thresholds and ranges pursuant to the environment or other conditions impacting the particular line of business. The thresholds and predetermined ranges may be set-up and managed via web screens that may be presented to management for inputting the threshold values or ranges for the different metrics. Such web interfaces or graphical user interfaces (GUIs) for entering data into fields over a network, such as the Internet, intranet or other network, is known.

In block 322, reports may be generated for management. The reports may include scores for each of the metrics and survey results for each element of the compliance system. The reports may be presented via a web interface.

Figure 4A:
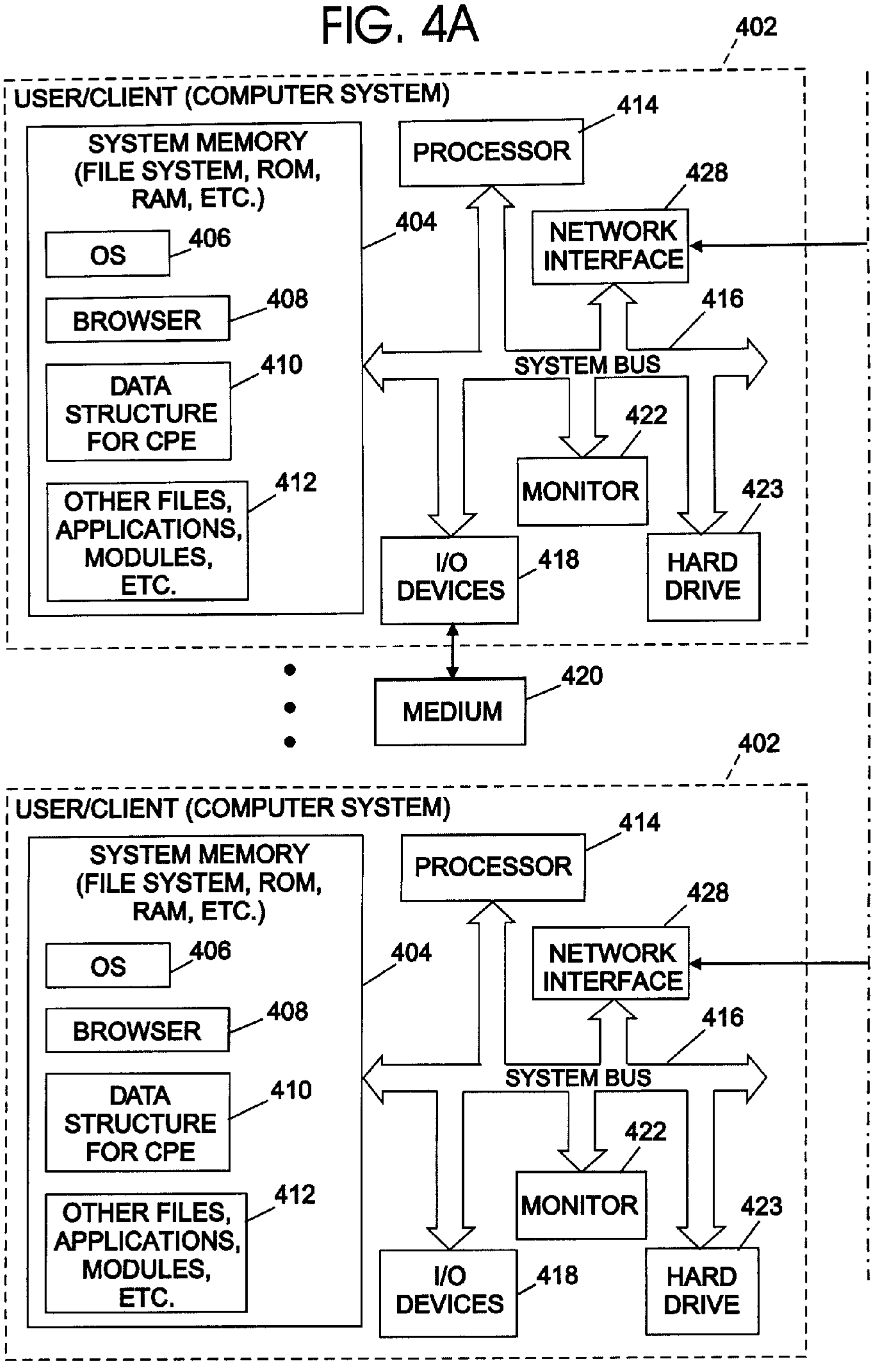
FIGS. 4A and 4B (collectively FIG. 4) are a block diagram of an exemplary system for determining effectiveness of a compliance program in accordance with another embodiment of the present invention.
Figure 4B:
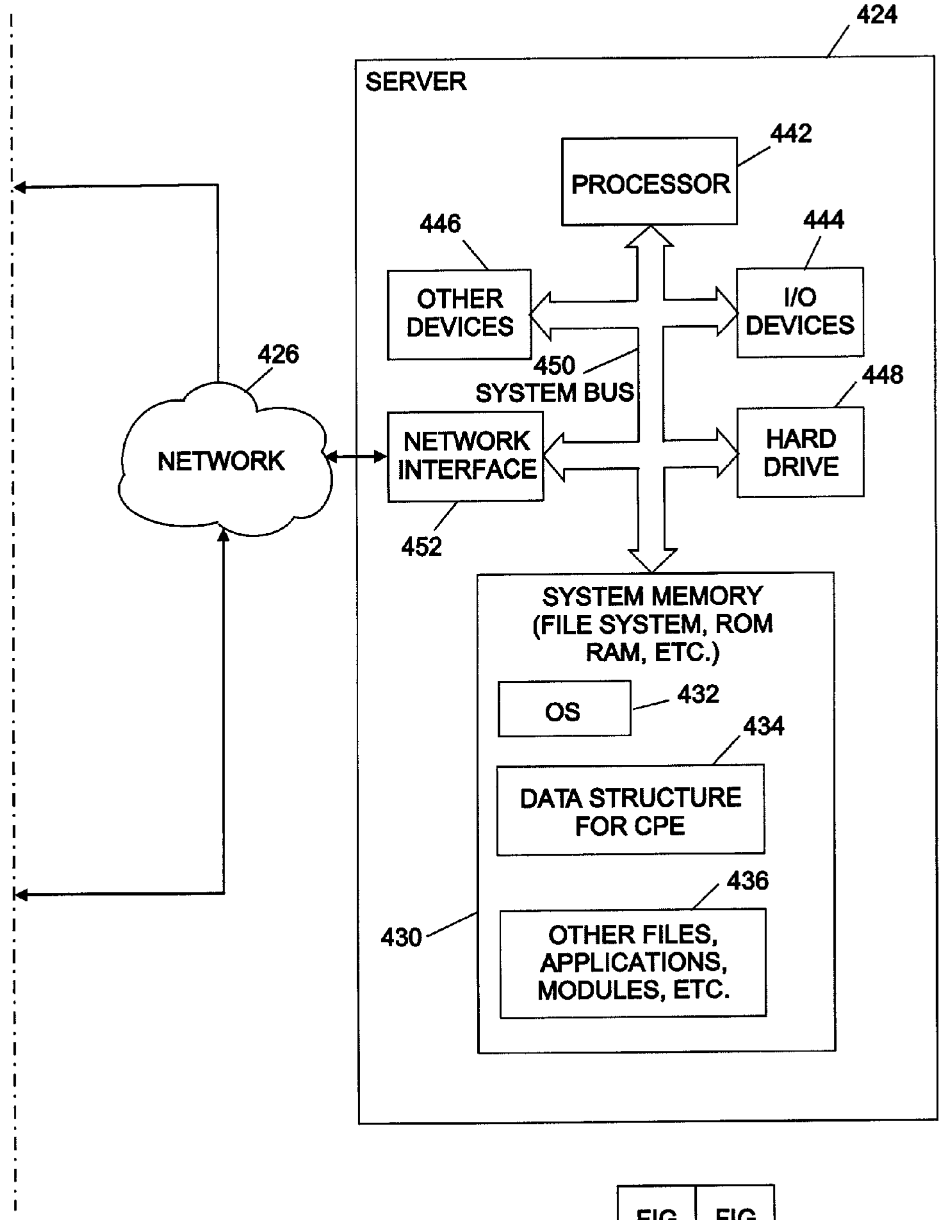
Figure 4:
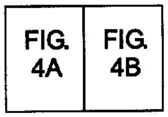

FIG. 4 is a block diagram of an exemplary system 400 for determining effectiveness of a compliance program in accordance with another embodiment of the present invention. The elements of the methods 100 and 200 and system 300 may be embodied in or performed by the system 400. The system 400 may include one or more user or client computer systems 402 or similar systems or devices.

The computer system 402 may include a system memory or local file system 404. The system memory 404 may include a read only memory (ROM) and a random access memory (RAM). The ROM may include a basic input/output system (BIOS). The BIOS may contain basic routines that help to transfer information between elements or components of the computer system 402. The RAM may contain an operating system 406 to control overall operation of the computer system 402. The RAM may also include a browser 408 or web browser. The browser 408 may be used to present the web interfaces described with respect to system 300 of FIG. 3. The RAM may also include data structures 410 or computer-executable code for determining the effectiveness of a compliance program that may be similar or include elements of the methods 100 and 200 of FIGS. 1 and 2, respectively. The RAM may further include other application programs 412, other program modules, data, files and the like.

The computer system 402 may also include a processor or processing unit 414 to control operations of the other components of the computer system 402. The operating system 406, browser 408, data structures 410 and other program modules 412 may be operable on the processor 414. The processor 414 may be coupled to the memory system 404 and other components of the computer system 402 by a system bus 416.

The computer system 402 may also include multiple input devices, output devices or combination input/output devices 418. Each input/output device 418 may be coupled to the system bus 416 by an input/output interface (not shown in FIG. 4). The input and output devices or combination I/O devices 418 permit a user to operate and interface with the computer system 402 and to control operation of the browser 408 and data structures 410 to access, operate and control the system for determining effectiveness of a compliance program. The I/O devices 418 may include a keyboard and computer pointing device or the like to perform the operations discussed herein.

The I/O devices 418 may also include disk drives, optical, mechanical, magnetic, or infrared input/output devices, modems or the like. The I/O devices 418 may be used to access a medium 420. The medium 420 may contain, store, communicate or transport computer-readable or computer-executable instructions or other information for use by or in connection with a system, such as the computer systems 402.

The computer system 402 may also include or be connected other devices, such as a display or monitor 422. The monitor 422 may be used to permit the user to interface with the computer system 402.

The computer system 402 may also include a hard disk drive 423. The hard drive 423 may be coupled to the system bus 416 by a hard drive interface (not shown in FIG. 4). The hard drive 423 may also form part of the local file system or system memory 404. Programs, software and data may be transferred and exchanged between the system memory 404 and the hard drive 423 for operation of the computer system 402.

The computer systems 402 may communicate with a remote server 424 and may access other servers or other computer systems (not shown) similar to computer system 402 via a network 426. The system bus 416 may be coupled to the network 426 by a network interface 428. The network interface 428 may be a modem, Ethernet card, router, gateway or the like for coupling to the network 426. The coupling may be a wired connection or wireless. The network 426 may be the Internet, private network, an intranet or the like.

The server 424 may also include a system memory 430 that include a file system, ROM, RAM and the like. The system memory may include an operating system 432 similar to operating system 406 in computer systems 402. The system memory 430 may also include data structures 434 for determining effectiveness of a compliance program. The data structures 434 may include operations similar to those described with respect to methods 100 and 200 for determining effectiveness of a compliance program in FIG. 1 and FIG. 2, respectively. Clients, such as computer systems 402 or the like, may access the data structures 434 for automated risk or compliance management in accordance with an embodiment of the present invention.

The server system memory 430 may also include other files 436, applications, modules and the like. The server 424 may also include a processor 442 or a processing unit to control operation of other devices in the server 424. The server 424 may also include I/O device 444. The I/O devices 444 may be similar to I/O devices 418 of computer systems 402. The server 424 may further include other devices 446, such as a monitor or the like to provide an interface along with the I/O devices 444 to the server 424. The server 424 may also include a hard disk drive 448. A system bus 450 may connect the different components of the server 424. A network interface 452 may couple the server 424 to the network 426 via the system bus 450.

Figure 1:
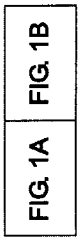

Elements of the present invention, such as methods 100 and 200 of FIGS. 1 and 2 and system 300 of FIG. 3, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 400 of FIG. 4. Examples of such a medium may be illustrated in FIG. 11 as network 426 or medium 420 and I/O devices 418 and 444. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

While the examples used in describing the present invention may be related to the banking or financial industry, the principles and features of the present invention may be adapted to any business or industry were determining the effectiveness of a compliance program may be important.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for determining an effectiveness of a legal and regulatory compliance program of one business entity, comprising:

identifying a plurality of lines of business of the one business entity, wherein each of the plurality of lines of business performs a different function within the one business entity;

determining by each of the plurality of lines of business:

(a) a compliance survey comprising a plurality of prompts and/or a plurality of queries relating to a legal and regulatory compliance of the line of business, wherein the prompts and/or queries for each compliance survey for each of the plurality of lines of business are different, (b) a compliance survey scale for scoring responses to the plurality of prompts and/or the plurality of queries in the compliance survey for each of the plurality of lines of business, wherein each compliance survey scale comprises a range of values, wherein each compliance survey scale for each of the plurality of lines of business is different, and wherein each value within the range of values for each compliance survey scale for each line of business corresponds to an option for responding to each of the prompts and/or queries in the compliance survey for each of the plurality of lines of business, and (c) a score for each of the responses of each compliance survey based on the compliance survey scale for each of the plurality of lines of business;

collecting, from each line of business, subjective data related to an effectiveness of the legal and regulatory compliance program of the one business entity that ensures that the one business entity complies with laws and regulations enforced by at least one governmental agency, the subjective data comprising responses to the compliance survey for each of the plurality of lines of business;

collecting objective data from each of the plurality of lines of business relating to the effectiveness of the legal and regulatory compliance program of the one business entity;

providing a common compliance survey scoring standard for the one business entity, wherein the common compliance survey scoring standard is determined independently and is different from each of the compliance survey scales for each line of business of the one business entity;

converting the score for the responses to the compliance survey for each of the plurality of lines of business of the one business entity to a normalized score based at least partially on the common compliance survey scoring standard for the one business entity;

in response to the converting, calculating, by a computing device processor:

(a) a compliance effectiveness score for each of the plurality of lines of business of the one business entity based on the subjective data associated with the compliance survey responses for each of the plurality of lines of business that is converted to the common compliance survey scoring standard and the objective data collected, and (b) an overall compliance effectiveness score for the one business entity based at least partially on the compliance effectiveness score for each of the plurality of lines of business within the one business entity; and determining whether or not each of the plurality of lines of business are in legal and regulatory compliance based on a comparison of the compliance effectiveness score for each of the plurality of lines of business to a range of compliant effectiveness scores.

2. The method of claim 1, wherein collecting the subjective data comprises conducting a survey containing statements related to effectiveness of the compliance program.

3. The method of claim 1, wherein collecting the objective data comprises collecting data related to each of a plurality of effectiveness metrics associated with a plurality of elements forming a compliance program effectiveness system.

4. The method of claim 3, further comprising adding, deleting and amending effectiveness metrics in response to any changes in compliance requirements.

5. The method of claim 3, further comprising setting acceptable ranges and thresholds for each effectiveness metric by line of business.

6. The method of claim 1, wherein the compliance survey responses comprise responses related to:

measuring commitment and accountability;

measuring policy and procedure compliance;

measuring control and supervision compliance;

assessing regulatory oversight;

assessing monitoring efforts;

measuring effectiveness of reporting compliances issues; and measuring training and awareness related to compliance.

7. The method of claim 1, wherein collecting subjective data comprises evaluating responses to a compliance survey including statements related to commitment and accountability; and wherein collecting objective data comprises determining a number of compliance related projects not meeting a predetermined threshold and determining a number of outstanding compliance and regulatory issues.

8. The method of claim 1, wherein collecting subjective data comprises evaluating responses to a compliance survey including statements related to compliance of policies and procedures; and wherein collecting objective data comprises determining a number of violations of policies and regulations.

9. The method of claim 1, wherein collecting subjective data comprises evaluating responses to a compliance survey including statements related to controls and supervision; and wherein collecting objective data comprises determining a number of unresolved compliance program assessment gaps.

10. The method of claim 1, wherein collecting subjective data comprises evaluating responses to a compliance survey including statements related to regulatory oversight; and wherein collecting objective data comprises determining a number and severity of issues raised by supervisory and regulatory agencies.

11. The method of claim 1, wherein collecting subjective data comprises evaluating responses to a compliance survey including statements related to monitoring efforts; and wherein collecting objective data comprises evaluating effectiveness of monitoring regulatory and compliance issues, measuring effectiveness of corrective actions, and determining a percentage of compliance monitoring activities and projects completed.

12. The method of claim 11, wherein collecting subjective data further comprises evaluating responses to a compliance survey including statements related to reporting compliance issues.

13. The method of claim 1, wherein collecting subjective data comprises evaluating responses to a compliance survey including statements related to training and awareness of compliance; and wherein collecting objective data comprises determining a percentage of employees meeting compliance training requirements.

14. A method for determining effectiveness of a compliance program of one financial institution, comprising:

identifying a plurality of lines of business of the one business entity, wherein each of the plurality of lines of business performs a different function within the one business entity;

determining by each of the plurality of lines of business:

(a) a compliance survey comprising a plurality of prompts and/or a plurality of queries relating to a legal and regulatory compliance of the line of business, wherein the prompts and/or queries for each compliance survey for each of the plurality of lines of business are different, (b) a compliance survey scale for scoring responses to the plurality of prompts and/or the plurality of queries in the compliance survey for each of the plurality of lines of business, wherein each compliance survey scale comprises a range of values, wherein each compliance survey scale for each of the plurality of lines of business is different, and wherein each value within the range of values for each compliance survey scale for each line of business corresponds to an option for responding to each of the prompts and/or queries in the compliance survey for each of the plurality of lines of business, and (c) a score for each of the responses of each compliance survey based on the compliance survey scale for each of the plurality of lines of business;

collecting, from each line of business, subjective data related to an effectiveness of the legal and regulatory compliance program of the one business entity that ensures that the one business entity complies with laws and regulations enforced by at least one governmental agency, the subjective data comprising responses to the compliance survey for each of the plurality of lines of business;

collecting objective data from each of the plurality of lines of business relating to the effectiveness of the legal and regulatory compliance program of the one business entity, wherein collecting objective data comprises determining for each of the plurality of lines of business:

a number of compliance related projects not meeting a predetermined threshold, a number of outstanding compliance and regulatory issues, a number of violations of policies and regulations, a number of unresolved compliance program assessment gaps, a number and severity of issues raised by supervisory and regulatory agencies, an effectiveness of monitoring regulatory and compliance issues, a percentage of compliance monitoring activities and projects completed, and a percentage of employees meeting compliance training requirements;

providing a common compliance survey scoring standard for the one business entity, wherein the common compliance survey scoring standard is determined independently and is different from each of the compliance survey scales for each line of business of the one business entity;

converting the score for the responses to the compliance survey for each of the plurality of lines of business of the one business entity to a normalized score based at least partially on the common compliance survey scoring standard for the one business entity;

in response to the converting, calculating, by a computing device processor:

(a) a compliance effectiveness score for each of the plurality of lines of business of the one business entity based on the subjective data associated with the compliance survey responses for each of the plurality of lines of business that is converted to the common compliance survey scoring standard and the objective data collected, and (b) an overall compliance effectiveness score for the one business entity based at least partially on the compliance effectiveness score for each of the plurality of lines of business within the one business entity; and determining whether or not each of the plurality of lines of business are in legal and regulatory compliance based on a comparison of the compliance effectiveness score for each of the plurality of lines of business to a range of compliant effectiveness scores.

15. A system for determining effectiveness of a compliance program, comprising:

a processor configured to:

identify a plurality of lines of business of the one business entity, wherein each of the plurality of lines of business performs a different function within the one business entity;

determine by each of the plurality of lines of business:

(a) a compliance survey comprising a plurality of prompts and/or a plurality of queries relating to a legal and regulatory compliance of the line of business, wherein the prompts and/or queries for each compliance survey for each of the plurality of lines of business are different, (b) a compliance survey scale for scoring responses to the plurality of prompts and/or the plurality of queries in the compliance survey for each of the plurality of lines of business, wherein each compliance survey scale comprises a range of values, wherein each compliance survey scale for each of the plurality of lines of business is different, and wherein each value within the range of values for each compliance survey scale for each line of business corresponds to an option for responding to each of the prompts and/or queries in the compliance survey for each of the plurality of lines of business, and (c) a score for each of the responses of each compliance survey based on the compliance survey scale for each of the plurality of lines of business;

collect, from each line of business, subjective data related to an effectiveness of the legal and regulatory compliance program of the one business entity that ensures that the one business entity complies with laws and regulations enforced by at least one governmental agency, the subjective data comprising responses to the compliance survey for each of the plurality of lines of business;

collect objective data from each of the plurality of lines of business relating to the effectiveness of the legal and regulatory compliance program of the one business entity;

provide a common compliance survey scoring standard for the one business entity, wherein the common compliance survey scoring standard is determined independently and is different from each of the compliance survey scales for each line of business of the one business entity;

convert the score for the responses to the compliance survey for each of the plurality of lines of business of the one business entity to a standardized score based at least partially on the common compliance survey scoring standard for the one business entity;

in response to the converting, calculate:

(a) a compliance effectiveness score for each of the plurality of lines of business of the one business entity based on the subjective data associated with the compliance survey responses for each of the plurality of lines of business that is converted to the common compliance survey scoring standard and the objective data collected, and (b) an overall compliance effectiveness score for the one business entity based at least partially on the compliance effectiveness score for each of the plurality of lines of business within the one business entity; and determine whether or not each of the plurality of lines of business are in legal and regulatory compliance based on a comparison of the compliance effectiveness score for each of the plurality of lines of business to a range of compliant effectiveness scores.

16. The system of claim 15, wherein the compliance survey responses comprise statements related to effectiveness of the compliance program.

17. The system of claim 15, wherein the objective data comprises data related to each of a plurality of effectiveness metrics associated with a plurality of elements forming a compliance program effectiveness system.

18. The system of claim 15, wherein the objective data comprises:

commitment and accountability measurements;
policy and procedure compliance measurements;
control and supervision compliance measurements;
regulatory oversight assessments;
monitoring efforts assessments;
effectiveness of reporting compliance issues measurements; and
training and awareness related to compliance measurements.

19. The system of claim 15, wherein the compliance survey responses comprise:

statements related to commitment and accountability;
statements related to compliance of policies and procedures;
statements related to controls and supervision;
statements related to regulatory oversight;
statements related to monitoring efforts;
statements related to reporting compliance issues; and
statements related to training and awareness of compliance.

20. The system of claim 15, wherein the objective data comprises:

a number of compliance related projects not meeting a predetermined threshold;
a number of outstanding compliance and regulatory issues;
a number of violations of policies and regulations;
a number of unresolved compliance program assessment gaps;
a number and severity of issues raised by supervisory and regulatory agencies;
a percentage of compliance monitoring activities and projects completed; and
a percentage of employees meeting compliance training requirements.

21. A non-transitory computer readable medium having computer readable program code embodied therein, the computer readable program code, when executed on a computer, causes the computer to:

identify a plurality of lines of business of the one business entity, wherein each of the plurality of lines of business performs a different function within the one business entity;

determine by each of the plurality of lines of business:

(a) a compliance survey comprising a plurality of prompts and/or a plurality of queries relating to a legal and regulatory compliance of the line of business, wherein the prompts and/or queries for each compliance survey for each of the plurality of lines of business are different, (b) a compliance survey scale for scoring responses to the plurality of prompts and/or the plurality of queries in the compliance survey for each of the plurality of lines of business, wherein each compliance survey scale comprises a range of values, wherein each compliance survey scale for each of the plurality of lines of business is different, and wherein each value within the range of values for each compliance survey scale for each line of business corresponds to an option for responding to each of the prompts and/or queries in the compliance survey for each of the plurality of lines of business, and (c) a score for each of the responses of each compliance survey based on the compliance survey scale for each of the plurality of lines of business;

collect, from each line of business, subjective data related to an effectiveness of the legal and regulatory compliance program of the one business entity that ensures that the one business entity complies with laws and regulations enforced by at least one governmental agency, the subjective data comprising responses to the compliance survey for each of the plurality of lines of business;

collect objective data from each of the plurality of lines of business relating to the effectiveness of the legal and regulatory compliance program of the one business entity;

provide a common compliance survey scoring standard for the one business entity, wherein the common compliance survey scoring standard is determined independently and is different from each of the compliance survey scales for each line of business of the one business entity;

convert the score for the responses to the compliance survey for each of the plurality of lines of business of the one business entity to a normalized score based at least partially on the common compliance survey scoring standard for the one business entity;

in response to the converting, calculate:

(a) a compliance effectiveness score for each of the plurality of lines of business of the one business entity based on the subjective data associated with the compliance survey responses for each of the plurality of lines of business that is converted to the common compliance survey scoring standard and the objective data collected, and (b) an overall compliance effectiveness score for the one business entity based at least partially on the compliance effectiveness score for each of the plurality of lines of business within the one business entity; and determine whether or not each of the plurality of lines of business are in legal and regulatory compliance based on a comparison of the compliance effectiveness score for each of the plurality of lines of business to a range of compliant effectiveness scores.

22. The non-transitory computer readable medium of claim 21, a wherein the compliance survey responses comprise statements related to effectiveness of the compliance program.

23. The non-transitory computer readable medium of claim 21, wherein the objective data comprises data related to each of a plurality of effectiveness metrics associated with a plurality of elements forming a compliance program effectiveness system.

24. The non-transitory computer readable medium of claim 21, wherein the compliance survey responses comprise:

statements related to commitment and accountability;
statements related to compliance of policies and procedures;
statements related to controls and supervision;
statements related to regulatory oversight;

statements related to monitoring efforts;
statements related to reporting compliance issues; and
statements related to training and awareness of compliance.

25. The non-transitory computer readable medium of claim 21, wherein the objective data comprises:
a number of compliance related projects not meeting a predetermined threshold;
a number of outstanding compliance and regulatory issues;
a number of violations of policies and regulations;
a number of unresolved compliance program assessment gaps;
a number and severity of issues raised by supervisory and regulatory agencies;
a percentage of compliance monitoring activities and projects completed; and
a percentage of employees meeting compliance training requirements.

* * * * *